(12) United States Patent
Jakobsson

(10) Patent No.: US 8,312,073 B2
(45) Date of Patent: Nov. 13, 2012

(54) CAPTCHA-FREE THROTTLING

(75) Inventor: Bjorn Markus Jakobsson, Mountain View, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 288 days.

(21) Appl. No.: 12/535,202

(22) Filed: Aug. 4, 2009

(65) Prior Publication Data

US 2011/0035505 A1 Feb. 10, 2011

(51) Int. Cl.
*G06F 15/16* (2006.01)
(52) U.S. Cl. ........ 709/201; 709/203; 709/206; 709/207; 709/229
(58) Field of Classification Search .................. 709/201, 709/204, 206, 207, 203, 229
See application file for complete search history.

(56) References Cited

U.S. PATENT DOCUMENTS

| | | | |
|---|---|---|---|
| 7,840,653 B1* | 11/2010 | Cortes et al. .................. | 709/220 |
| 2003/0033367 A1* | 2/2003 | Itoh ............................... | 709/203 |
| 2005/0239447 A1* | 10/2005 | Holzman et al. ........... | 455/414.3 |
| 2006/0047766 A1* | 3/2006 | Spadea ......................... | 709/206 |
| 2010/0229223 A1* | 9/2010 | Shepard et al. .................. | 726/5 |
| 2010/0325427 A1* | 12/2010 | Ekberg et al. ................ | 713/156 |
| 2011/0029902 A1* | 2/2011 | Bailey .......................... | 715/764 |

\* cited by examiner

*Primary Examiner* — Djenane Bayard
(74) *Attorney, Agent, or Firm* — Shun Yao; Park, Vaughan, Fleming & Dowler LLP

(57) ABSTRACT

One embodiment provides a system that throttles access to a web resource. During operation, a throttle server receives a request to access the web resource. The request is associated with a computing device used by a user and is redirected from a server providing the web resource. The throttle server then determines whether the computing device has previously accessed a restricted resource different from the web resource corresponding to the request based on the presence or absence of a unique mark associated with the computing device. Based on the determination, the throttle server subsequently generates a response indicating whether the computing device meets a predetermined requirement for accessing the web resource, and sends the response to the server providing the web resource, thereby facilitating access throttling to the web resource.

17 Claims, 6 Drawing Sheets

CAPTCHA-FREE THROTTLING

FIELD

This disclosure is generally related to access control to a web resource. More specifically, this disclosure is related to CAPTCHA-free access throttling to a web resource by implementing a trusted authority.

RELATED ART

Many web service providers face the challenge of access control, which prevents people or organizations from abusing the web service's resources. For example, a service that provides webmail access, such as Hotmail™, Gmail™, and Yahoo!™ mail, needs to prevent malicious users (often email spammers) from using automated software to register large numbers of accounts. Online posting sites, such as blogs, forums, and wikis, need to prevent malicious users from using automated software, often referred to as robots or "bots," to submit posts for purposes of commercial promotion or harassment. In addition, websites that provide commercial services, such as eBay™ and Ticketmaster™, need to prevent malicious users from using automated software to exhaust available connections, thus blocking access by legitimate users.

To prevent the use of an automated response which may exhaust resources, many websites require a user to perform a CAPTCHA (Completely Automated Public Turing test to tell Computers and Humans Apart) test before establishing an account or accessing the website's resources. A CAPTCHA test is a visual or audio challenge that can be accurately solved by humans. Examples of CAPTCHA tests include distorted text or text with additional lines; both are difficult for optical character recognition (OCR) software to recognize.

Since the emergence of CAPTCHAs, there have been attempts to develop better pattern recognition software that is able to read CAPTCHAs. As a result, today's CAPTCHAs are much more complicated. However, as CAPTCHAs are strengthened to withstand increasingly powerful automated attacks, they are also becoming increasingly difficult for users to solve. It is possible that in the near future the CAPTCHAs may reach a point at which they become too hard for humans to solve. In addition, the increased use of I/O constrained devices (such as smart phones) may aggravate the problem.

Moreover, even a truly ideal CAPTCHA—one that cannot be beaten using automated methods and does not pose any usability problems—can be vulnerable to relay attacks that use humans to solve the puzzles. For example, CAPTCHAs from legitimated sites are commonly reposted on other sites, such as porn sites, and their solutions are fed back by the attacker to the original sites. Also, CAPTCHA-solving sweatshops have proliferated in developing nations during the last few years. These efforts to circumvent CAPTCHA tests raise the question of whether distinguishing between man and machine is really the best approach to control access.

SUMMARY

One embodiment provides a system that throttles access to a web resource. During operation, a throttle server receives a request to access the web resource. The request is associated with a computing device used by a user and is redirected from a server providing the web resource. The throttle server then determines a restricted resource, if any, the computing device has previously accessed based on the presence or absence of a unique mark associated with the computing device, wherein the restricted resource is different from the web resource corresponding to the request. Based on the determination, the throttle server subsequently generates a response indicating whether the computing device meets a predetermined requirement for accessing the web resource, and sends the response to the server providing the web resource, thereby facilitating access throttling to the web resource.

In a variation on this embodiment, responsive to determining that the computing device has not previously accessed the restricted resource, the throttle server initializes a registration process that involves the user's access to the restricted resource.

In a further variation, the registration process includes sending a small payment along with a random message to at least one of the user's financial accounts, or sending a random message to the user's cell phone.

In a further variation, the registration process includes receiving a reply from the user, wherein the reply is sent by the computing device, and comparing the user's reply with the previously sent random message In a further variation, the registration process includes planting a unique mark in the computing device.

In a further variation, the unique mark includes at least one of the following: an HTML cookie, a cache cookie, and a browsing history cookie.

In a variation on this embodiment, the throttle server is further configured to rewrite the unique mark in the computing device after receiving the mark.

In a variation on this embodiment, the predetermined requirement for accessing the web resource comprises a count number being less than a predetermined number, wherein the count number counts a number of accesses to the web resources originated from the computing device.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a system for controlling access to a web resource to prevent automated bot access or surrogated human access without the use of CAPTCHAs. In one embodiment, when a website receives a user's request to access a resource webpage, the website causes the user's machine to be identified by a trusted authority running a throttle server. If the throttle server fails to identify the user's machine, the user is required to establish, or revive, an account with the throttle server. Otherwise, the throttle server increases a count determining the number of accesses made by the user during the associated time period and determines whether the count exceeds a threshold number. Subsequently, the throttle server notifies the website whether it is safe to grant the user access to the webpage. To establish an account with the throttle server, the user is asked to associate one or more restricted resources, such as a bank account or a cell phone, with the account and ties one or more machines to the account. The throttle server then marks each of the machines with a reinforced cookie which can be used later by the server to identify the machine.

Throttle Account

To address the issues related to web-resource access-control using CAPTCHAs, embodiments of the present invention provide an account-based throttling system where individual computing devices are associated with accounts, and their transactions logged and counted by a trusted third party.

Figure 1:
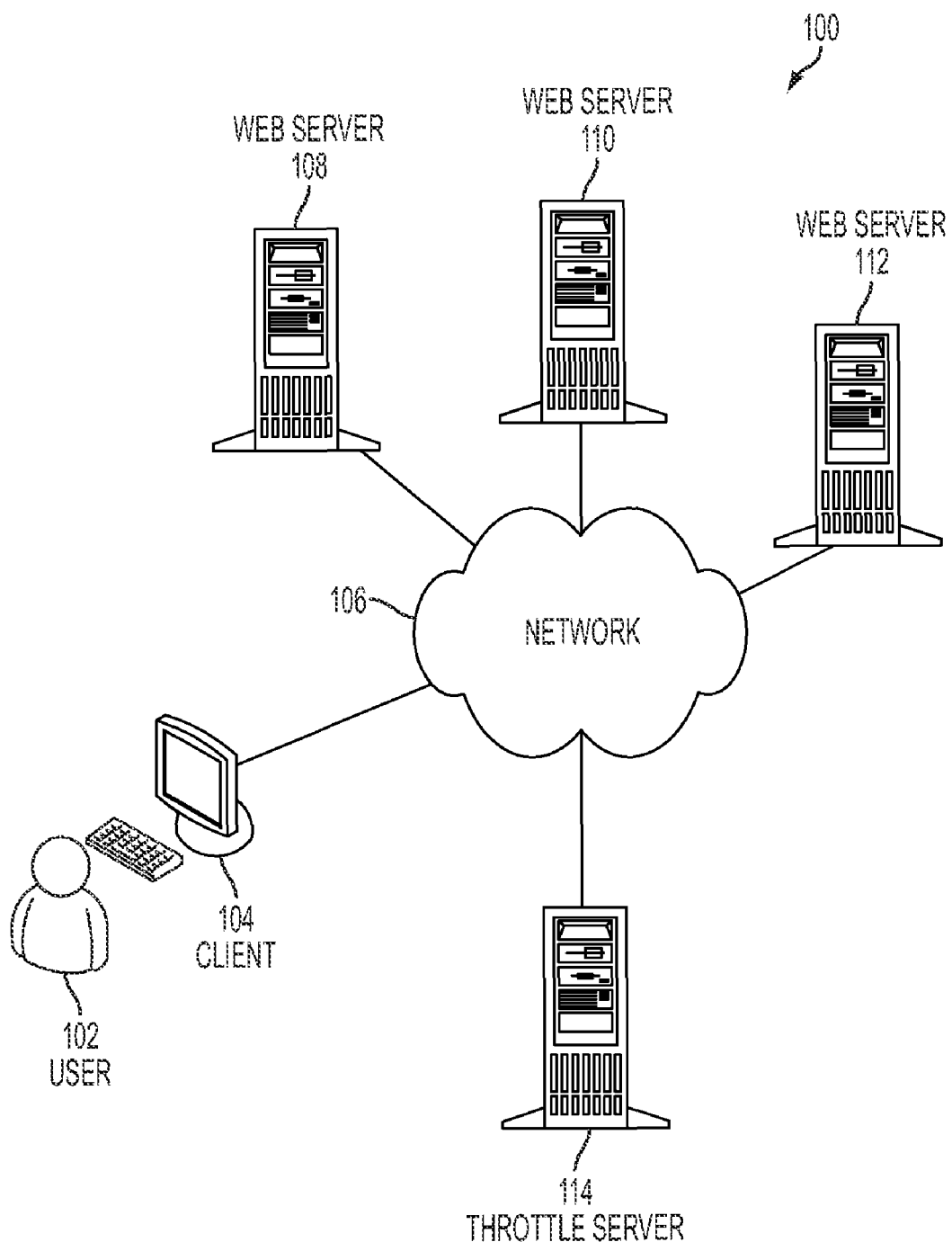
FIG. 1 illustrates an exemplary architecture for a computing environment associated with an access-throttling system in accordance with an embodiment of the present invention.

FIG. 1 illustrates an exemplary architecture for a computing environment 100 associated with an access-throttling system in accordance with an embodiment of the present invention. In one embodiment, a user 102 accesses a number of web servers 108-112 via a client 104 over a network 106. A throttle server 114 is also coupled to network 106.

Being aware of the fact that access to a requested web resource is throttled by throttle server 114, user 102 may want to set up a throttle account with throttle server 114 before accessing web servers 108-112. To set up a throttle account, user 102 first establishes access rights to a restricted resource, such as a bank account or a cell phone. Note that such an access right is most likely to have been established beforehand. When user 102 sets up a throttle account, throttle server 114 confirms user 102's ownership of such an access right and establishes a throttle account for user 102. Once a throttle account has been established, user 102 can associate one or more machines such as client 104 with the throttle account, and throttle server 114 in turn marks each of the machines. In addition to a bank account and a cell phone, examples of a restricted resource also include, but are not limited: a residential mailing address, a residential phone number, and other types of financial resources, such as a credit card account, a PayPal™ (trademark of PayPal, Inc. of San Jose, Calif.) account, or a stock-trade-brokerage account. All such restricted resources have the property of being difficult to obtain in a large number of accounts. For example, a person may have three or four financial accounts, but he typically does not have thousands of such accounts, at least not without an unusual amount of investments.

Client 104 can include any node with computational capability and a communication mechanism for communicating with web servers 108-112 over network 106. In some embodiments of the present invention, client 104 may correspond to a personal computer (PC), laptop computer, workstation, smart phone, personal digital assistant (PDA), and/or other electronic computing device with network connectivity. Furthermore, client 104 may couple to network 106 using wired and/or wireless connection.

Web servers 108-112 may correspond to nodes on a network that can provide a web service or resource to client 104. For example, web server 108 may provide email services or data storage services to user 102. Similarly, throttle server 114 corresponds to nodes on a network that include functionality to service requests from web servers 108-112 for throttling user access. For example, throttle server 114 may throttle access to a resource on web server 108. Throttle server 114 can be run by a third party that is trusted by web servers 108-112. In order for web servers 108-112 to have throttle server 114 throttling access to their resources, web servers 108-112 need to establish a relationship with throttle server 114 beforehand. In some embodiments, a web server may establish a relationship with more than one trusted party. Throttle server 114 and web servers 108-112 may participate in an advanced computing cluster, or can act as stand-alone servers.

Network 106 may correspond to any type of wired or wireless communication channels capable of coupling together computing nodes (e.g., client 104, web servers 108-112, and throttle server 114). This includes, but is not limited to, a local area network (LAN), a wide area network (WAN), and/or a combination of networks. In one or more embodiments of the present invention, network 106 includes the Internet. Network 106 may also include phone and cellular phone networks, such as Global Systems for Mobile communications (GSM) networks.

Figure 2:
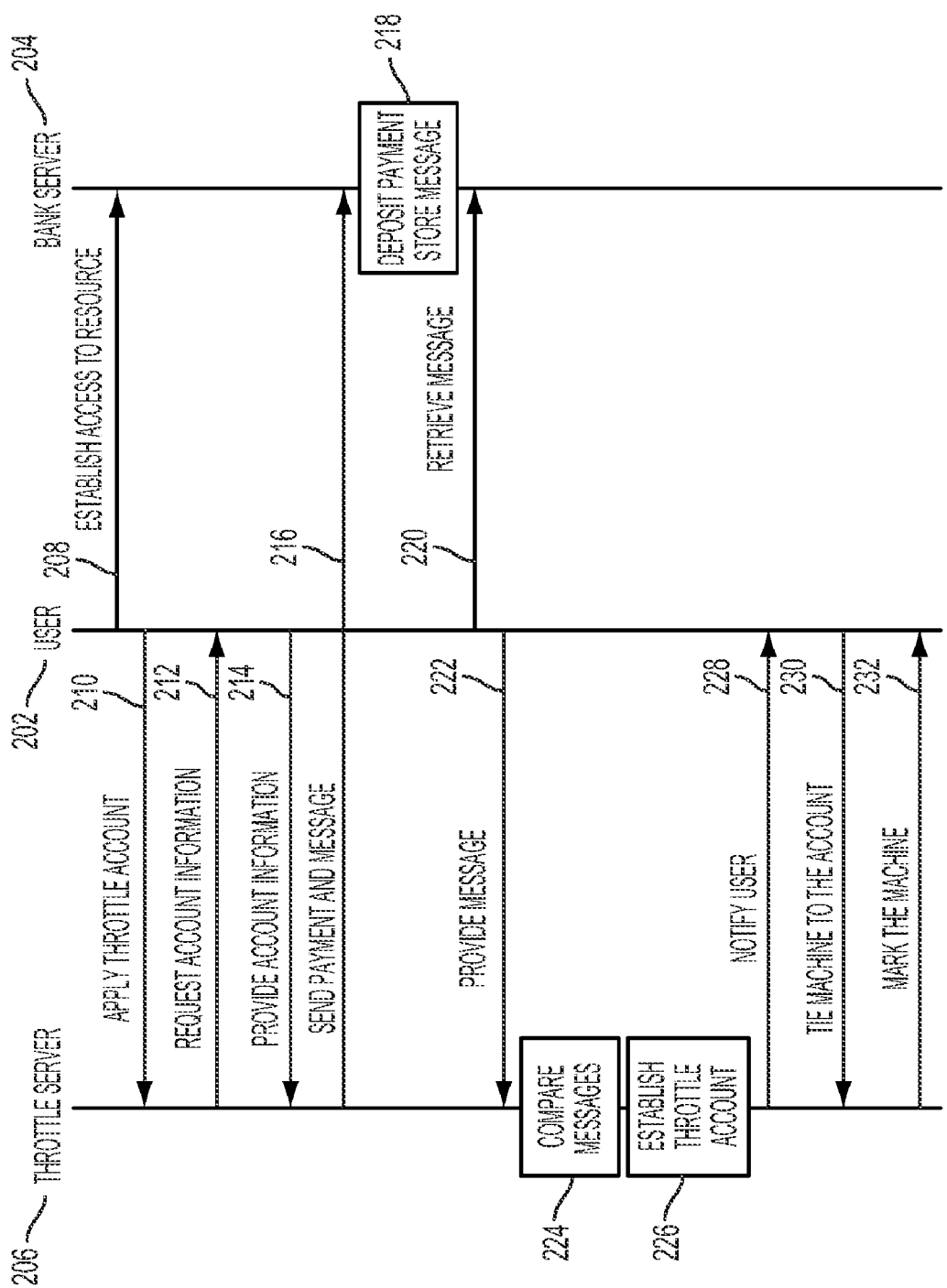
FIG. 2 presents an exemplary state diagram illustrating a process of setting up a throttle account in accordance with an embodiment of the present invention.

FIG. 2 presents an exemplary state diagram illustrating a process of setting up a throttle account in accordance with an embodiment of the present invention. Before applying for a throttle account, a user 202 establishes access to a bank account, at a bank server 204 (operation 208). Note that such access is often established beforehand, independent of the user's intention to set up a throttle account. User 202 applies a throttle account at a throttle server 206 (operation 210). Upon receiving user 202's request, throttle server 206 requests user 202 to provide bank account information (operation 212) and receives such information from user 202 (operation 214). In one embodiment, the bank account information can include a bank's identifier (such as the American Bankers Association (ABA) routing number) and an account number. Upon receiving the account information, throttle server 206 sends a small payment, such as one cent, and a message to the user's bank account at bank server 204 (operation 216). Note that most financial services allow a message to be sent with a fund transfer. In one embodiment, this message can be a random alphanumeric string that is sufficiently robust against any dictionary attack. Bank server 204 deposits the payment and stores the message to the user's bank account (operation 218). Subsequently, user 202 accesses bank server 204 to retrieve the message (operation 220), and provides throttle server 206 with the retrieved message (operation 222). Throttle server 206 compares the message provided by user 202 with the sent message (operation 224). If the messages match, throttle server 206 establishes a throttle account for user 202 (operation 226) and notifies user 202 (operation 228). A throttle account can include a user name and a password, which can be later used for retrieving the account information. In a further embodiment, instead of a fixed amount, throttle server 206 may send a small payment of a random amount to bank server 204, and user 202 provides throttle server with the payment amount and the message in order to prove his access right to the bank account. Furthermore, instead of providing financial account information to throttle server 206, user 202 can provide a cell phone number. In such a case, throttle server 206 sends a random SMS message to the provided cell phone number, and user 202 proves his access to the cell phone number by repeating the random SMS message back to throttle server 206.

Upon receiving the notice from throttle server 206, user 202 can associate a number of machines (computing devices) such as client 104 with the established throttle account (operation 230). For example, in addition to a personal computer (PC), user 202 can also associate his smart phone with his throttle account. The process of linking associated computing devices to the throttle account can occur over time. For example, every time user 202 acquires a new computing device, such as a new laptop computer, he may wish to associate such a device with his throttle account. In one embodiment, user 202 can use this device to access his throttle account on throttle server 206. In turn, throttle server 206 marks the machine, associates it with the throttle account (operation 232), and uses such information for future access throttling to a web resource.

It is possible for throttle server 206 to mark a machine by allowing user 202 to download plugins or other executables. Throttle server 206 can also mark a machine by using cookies, such as HTML cookies. An HTML cookie is a piece of data stored in a specially designated cache in a web browser, which can be used by web servers to personalize webpages. Because HTML cookies are often cleared by users or some types of software, other types of cookies, such as cache cookies and browser history cookies, may be used as backups to mark a machine. A cache cookie is a form of persistent state in the browser that a server can access. One type of cache cookie is based on Temporary Internet Files (TIFs), which are data objects—such as images—cached locally in standard browsers. By caching a particular TIF X associated with its domain, a server effectively writes a bit into the browser. By causing a client to display a webpage containing X, and then seeing whether the client requests X, the server can determine if X is present as a TIF in the client browser's cache. Thus, by testing for the presence or absence of TIF X, a server can read a bit from the browser. In addition, cache cookies can use the browser history and other types of browser caches (e.g., images, flash objects, etc.) to store data. One possible way for a server to plant a cache cookie on a client machine is to plant a TIF by giving them appropriate URLs (Uniform Resource Locators). For example, a server can write to the browser cache by causing the client to make a series of HTTP requests to cacheable content, such as images. Cache cookies, however, are slower to read and write than regular cookies. Thus, a "reinforced cookie," which includes various types of cookies can be a more effective way of marking a machine.

Such a reinforced cookie can be written by encoding an identifier using each one of the underlying cookie types and writing each one of these to the target machine. In one embodiment, throttle server 206 sets one HTML cookie, one cache cookie, and one browser history cookie on a target machine associated with a throttle account using an identifier in a format of ($id_s$, count, type, auth). Here, $id_s$ is a unique and static identifier of the throttle account, count is a monotonically increasing counter associated with the throttle account, type identifies the type of the cookie, and auth is a MAC (message authentication code) of ($id_s$, count, type) using a key known to the throttle server only. Each time a user (the owner of throttle account) requests access, throttle server 206 increases the counter by one, thus recording the number of accesses made by the user during an associated time period. Note that the time period may be one day, one week, one month, or other predetermined time period. Furthermore, throttle server 206 may keep a more detailed log corresponding to a specific throttle account. Such information can be used to identify potential abuse.

In addition to the HTML cookie, cache cookie, and browser history cookie associated with the domain of throttle server 206, in one embodiment, throttle server 206 also sets one HTML cookie, one cache cookie, and one browser history cookie for each IP address used by the server. Such a redundant marking technique can be used to help identify cookie theft, machine-cloning attacks, and DNS-poisoning attacks as explained in more detailed later.

Note that the process of setting up a throttle account can occur before or after a user tries to access web resources. Sometimes, a user is not aware of the existence of the throttle server and might not set up a throttle account beforehand. As a result, when the user tries to access a web resource, the web server causes the user's machine to connect to the throttle server, which in turn initializes a setup process to establish a throttle account for the user.

Access Throttling

Figure 3:
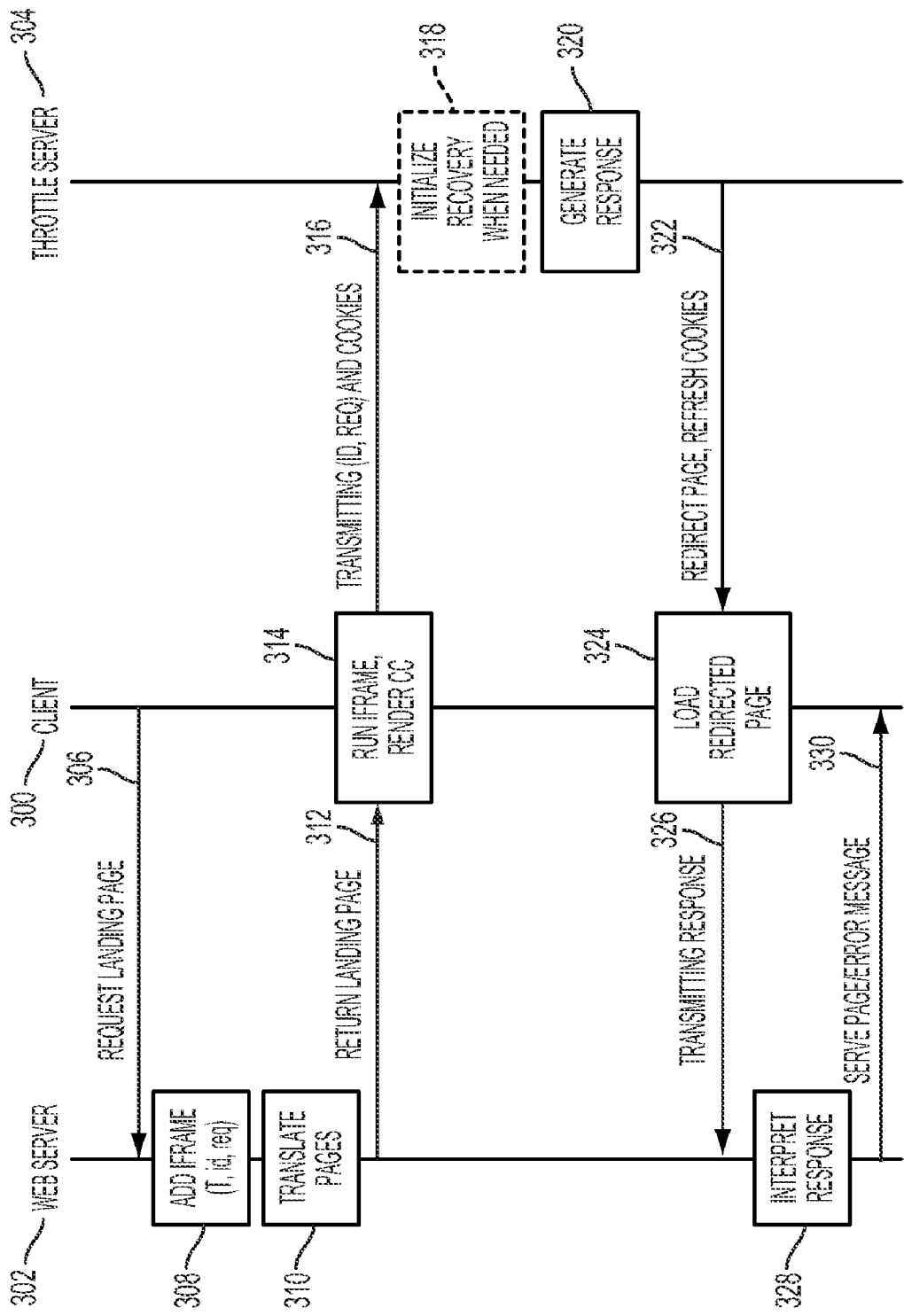
FIG. 3 presents an exemplary state diagram illustrating a process of throttling access to a web resource in accordance with an embodiment of the present invention.

FIG. 3 presents an exemplary state diagram illustrating a process of throttling access to a web resource in accordance with an embodiment of the present invention. During operation, a user requests the landing page $W_1$ of a set of resource webpages W (W={$W_i$}) via a client 300 from a web server 302 (operation 306). Note that loading such webpages may grant the user access to a resource located on web server 302. For example, the set of webpages may be registration pages from a web email provider, and the successful loading of such pages grants the user access to an email account and associated storage space on web server 302. Upon receiving client 300's request, web server 302 inserts an <iframe> tag (which defines an inline frame, referred to as "iframe" herein after) in the landing page $W_1$ to create a page $W'_1$ (operation 308). The iframe references content from a URL T/id/req, where T is a landing page of the throttle server, id is a session identifier, and req may contain special requests in terms of throttling policies. Note that the session identifier can be in the format of ($id_s$, count, type, auth) as described previously. The iframe may also contain a set of HTML encoded cache cookie (CC) that cause client 300 to release its cache and browser history cookies to throttle server 304. Web server 302 identifies a subset of pages $W_i$ (i>k for some value k) within the set W that can only be accessed by a user whose machine passes a throttle test, and translates the subset of pages by replacing any reference to a page $W_i$ (i>k) with a reference to $W_i$/id (operation 310). Such a translation augments the URL addresses of a page with the session identifier.

Web server 302 returns the modified landing page to client 300 (operation 312). Client 300 runs the iframe that references T/id/req, and renders the set of HTML encoded CC (operation 314). Loading T/id/req causes client 300 to transmit (id, req) to throttle server 304, and rendering the CC causes client 300 to send cache cookies and browser history cookies to throttle server 304 if they are present (operation 316). Due to the delay of rendering the HTML codes, these cookies might be communicated with a lag after the page request and the standard HTML cookie. Upon receiving the information transmitted from client 300, if no HTML cookies, cache cookies, or browser history cookies are received, throttle server 304 initializes a recovery process (operation 318). The recovery process may involve a traffic redirect (if client 300 is marked by a different throttle server), requesting a throttle account identifier such as a user ID and a password (if the user of client 300 has a throttle account with throttle server 304, but cookies on client 300 were lost), and requesting the user to set up a throttle account if the user does not have one. In the scenario where the user has a throttle account but the cookies are lost, the user may be challenged to prove access to a restricted resource already associated with the account. For example, the user may be asked to retrieve a secret code from an email sent to an email address associated with the throttle account. In the scenario where the user does not have a throttle account, throttle server 304 may challenge the user to solve traditional CAPTCHAs.

Based on req, the result of the read of the cookie (or other marks that were planted by throttle server 304) from client 300, and the outcome of the recovery process (when applicable), throttle server 304 generates a response R (operation 320). Response R includes id, potential auxiliary information to be transmitted to web server 302, and a throttle decision. Throttle server 304 computes $\mu=MAC_{K_s}(R)$, where $K_s$ is a key known only by web server 302 and throttle server 304. Note that such a key can be exchanged between web server 302 and throttle server 304 in a secure manner when web server 302 establishes a relationship with throttle server 304. Throttle server 304 sends the response to web server 304 by redirecting client 300 to a page $W_1/R/\mu$ managed by web server 302, and rewrites all cookies on client 300 (operation 322). Rewriting cookies (including all cookie types) can maximize the survivability of the reinforced cookie. During cookie rewriting, the previous session identifier is replaced with a new unique identifier. Client 300 loads the redirected page (operation 324), thus transmitting (R, $\mu$) to web server 302 (operation 326). Note that, because the purpose of redirecting client 300 to a page $W_1/R/\mu$ is to communicate information, it does not matter whether such a page exists. In one embodiment, the iframe added to the landing page $W_1$ is zero-sized; as a result, the user is not aware of how the throttle request was resolved, or that it even took place. In an alternative embodiment, throttle server 304 sends the response directly to web server 302 without using client 300 as a relay point.

Upon receiving the response from throttle server 304 via client 300, web server 302 interprets the response (operation 328). To interpret the response, web server 302 first verifies whether $\mu=MAC_{K_s}(R)$. If not, web server 302 determines that the throttle request failed. Otherwise, web server 302 determines what actions to take based on R. If the throttle decision states that client 300 has passed the throttle test, the id included in R is entered in a database of accepted identifiers. Such a database can be distributed among all servers of web server 302. Subsequently, any requests for pages $W_i$ (i>k) containing id (using a URL $W_i$/id) will be accepted for the duration of the session, and the requested pages are served (operation 330). Note that content of the database of accepted identifiers may be set to be erased after a certain expiration period, unless client 300 passes a new throttle test. If the throttle decision states that client 300 failed the throttle test, such as that the count exceeds a threshold number, or that throttle server 304 cannot verify the identity of client 300 and a subsequent recovery process failed as well, web server 302 serves an error message instead of the requested pages (operation 330). Note that the threshold of the access request within a time period can be a fixed number or a function. Considering the possibility that an adversary may control a number of throttle accounts, using a secret or randomized policy to set up the threshold can make it harder for the adversary to maximize his success (assuming that he loses access to accounts that are flagged as being corrupted).

It is possible to make the access to resource webpages appear instantaneous, even if the throttle process may generate a slight delay. For example, if a user is trying to gain access to a search interface, to which access is throttled, while the web server is waiting for a response from a throttle server, the user is presented with the search bar and is allowed to enter his search phrase. As long as the throttle process (the process of identifying the user's machine) is completed before the user finishes typing the search phrase, the user will not perceive any delay at all.

Throttling System

Figure 4:
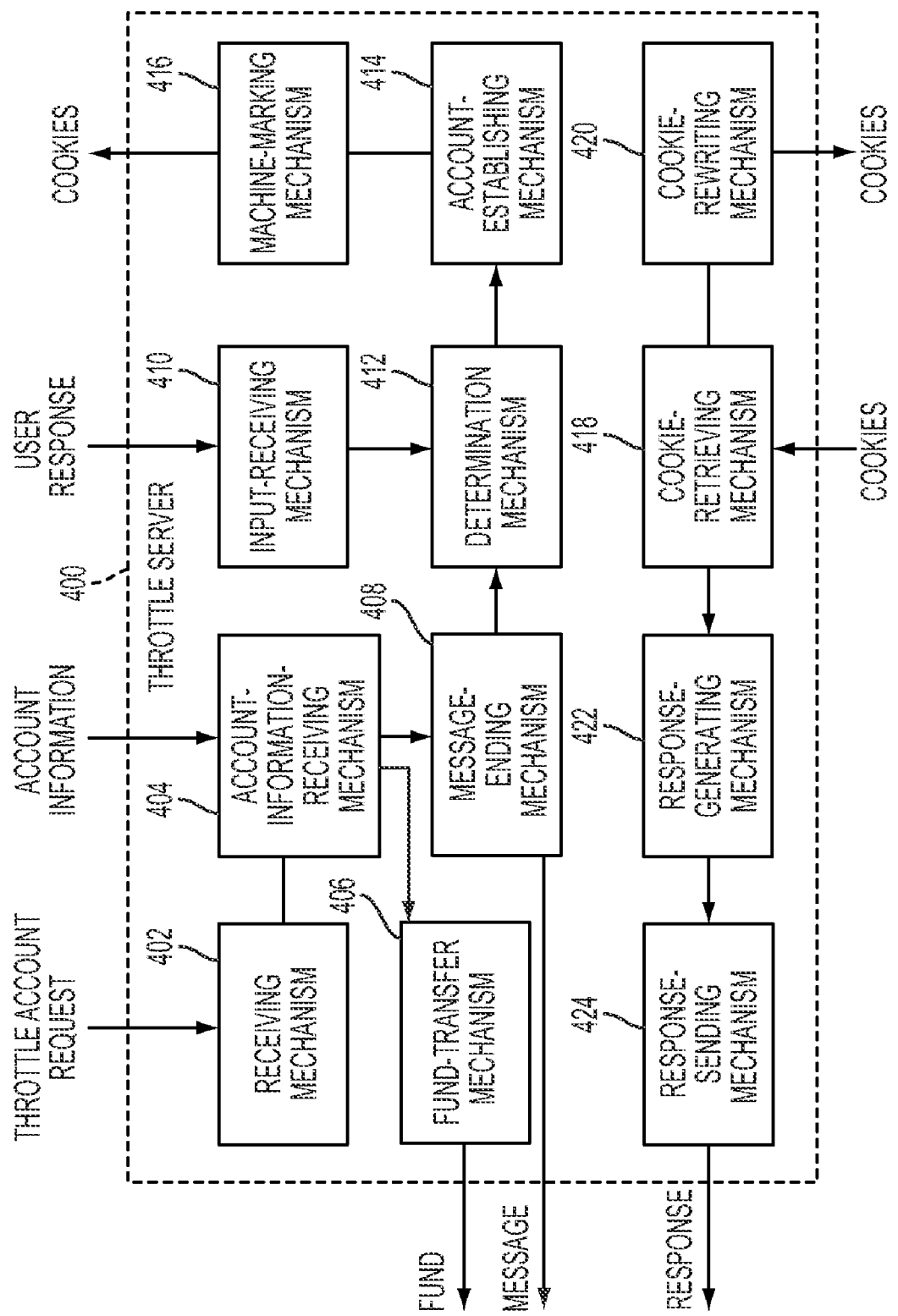
FIG. 4 presents a block diagram of a throttle server in accordance with an embodiment of the present invention

FIG. 4 presents a block diagram of a throttle server in accordance with an embodiment of the present invention. Throttle server 400 includes a receiving mechanism 402, an account-information-receiving mechanism 404, a fund-transfer mechanism 406, a message-sending mechanism 408, an input-receiving mechanism 410, a determination mechanism 412, an account-establishing mechanism 414, a machine-marking mechanism 416, a cookie-retrieving mechanism 418, a cookie-rewriting mechanism 420, a response-generating mechanism 422, and a response-sending mechanism 424.

During the set up process, receiving mechanism 402 receives from a user a request for establishing a throttle account. Account-information-receiving mechanism 404 then requests and receives information regarding a financial account from the user. Subsequently, fund-transfer mechanism 406 transfers a small sum of money to the user's account. For example, fund-transfer mechanism 406 can transfer one cent to the requesting user's account. In addition, message-sending mechanism 408 sends a message along with the fund.

Subsequently, throttle server 400 may request the user to input a response based on the message. For example, the user may receive an email from throttle server 400 notifying the user to click on a link which leads to a web page that asks for the message. In response, input-receiving mechanism 410 receives an input from the user. Determination mechanism 412 then determines whether the user input is consistent with the message sent by throttle server 400. If so, account-establishing mechanism 414 establishes a throttle account for the user. Otherwise, the user's request is denied.

Machine-marking mechanism 416 then marks a number of computing devices associated with the throttle account. In one embodiment, machine-marking mechanism 416 marks a machine by setting a reinforced cookie on the target machine. During the access-throttling process, a user is trying to access a web resource using his machine, and the web server causes the user's machine to transmit its cookies to cookie-retrieving mechanism 418 on throttle server 400. Once the cookies are received by throttle server 400, cookie-rewriting mechanism 420 rewrites the reinforced cookie on the target machine. Response-generating mechanism 422 generates a response including the throttle result based on the received cookies, and response-sending mechanism 424 sends the generated response to the web server.

Note that it is possible that an adversary can initiate a large number of throttle requests to overwhelm throttle server 400. However, when the throttling system uses distributed servers run by a large organization, such as Google Inc. of Mountainview, Calif., Yahoo! Inc. of Sunnyvale, Calif., or Akamai Technologies Inc. of Cambridge, Mass., such concern is not great as the system is already facing the risk of denial-of-service (DoS) attacks. If throttle server 400 is run by a smaller organization, such attack may cause the system to use a fallback technique where traditional CAPTCHAs are used for timed out requests. It is possible to perform another throttle test later during the session to prevent adversary from using DoS attacks to circumvent the protection.

Figure 5:
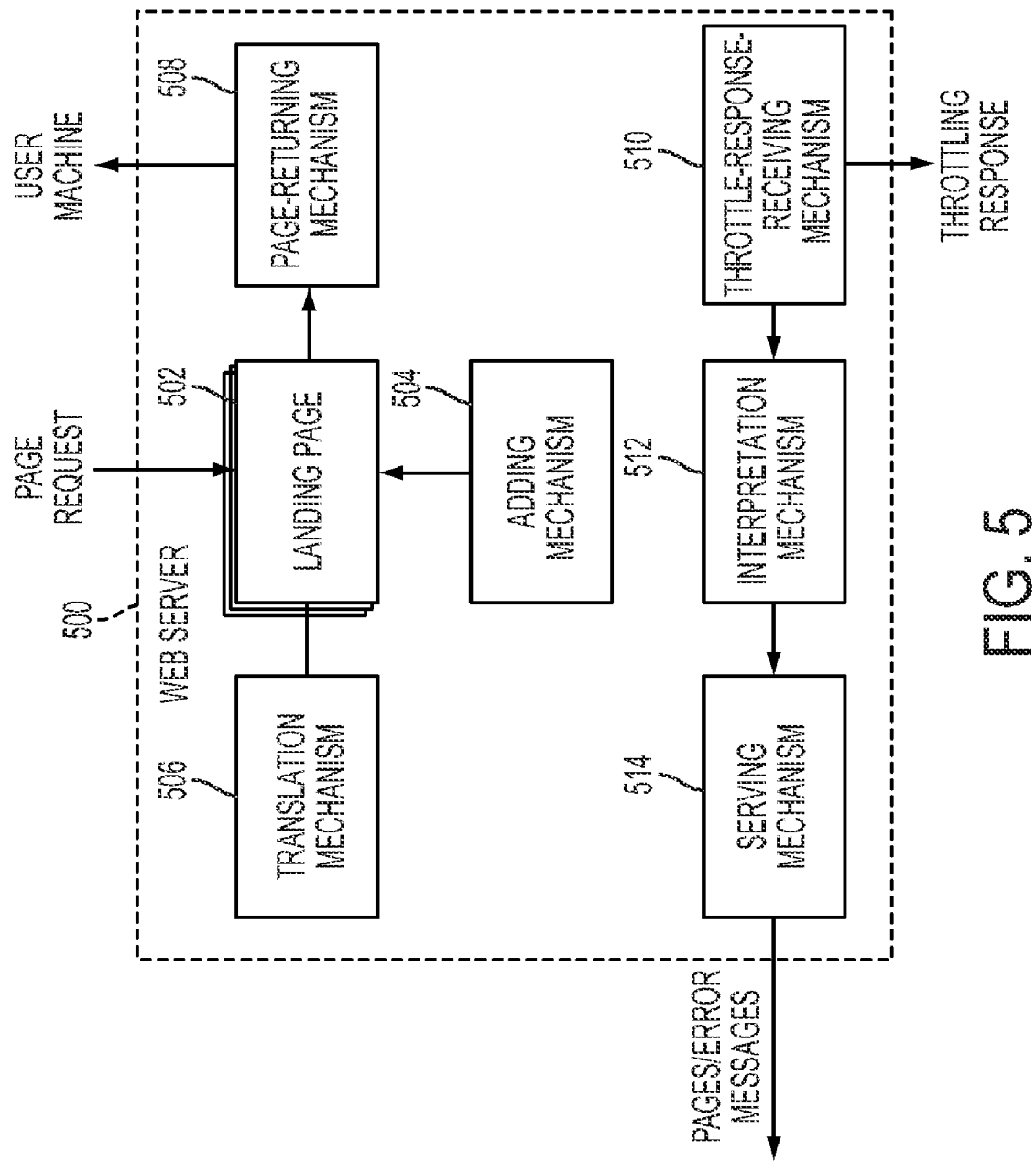
FIG. 5 presents a block diagram of a web server implementing access throttling in accordance with an embodiment of the present invention.

FIG. 5 presents a block diagram of a web server implementing access throttling in accordance with an embodiment of the present invention. Web server 500 includes a set of webpages including a landing page 502, an adding mechanism 504, a translation mechanism 506, a page-returning mechanism 508, a throttle-response-receiving mechanism 510, an interpretation mechanism 512, and a serving mechanism 514. When web server 500 receives a user's request for uploading landing page 502, adding mechanism 504 adds an iframe into landing page 502. Translation mechanism 506 translates the set of original webpages to a set of webpages that have the same appearance and functionality when rendered on a machine that passes the throttle test. Note that the translation process is run for each session, and a new instance can be produced in the case where a user reloads landing page 502 without having ended the session before. Page-returning mechanism 508 returns the modified landing page to the user's machine, which causes the user's machine to be identified by a throttle server. Throttle-response-receiving mechanism 510 receives a throttle response from the throttle server, and interpretation mechanism 512 interprets the throttle response. Based on the interpretation, serving mechanism 514 serves the requested webpages or an error message to the user's machine.

Figure 6:
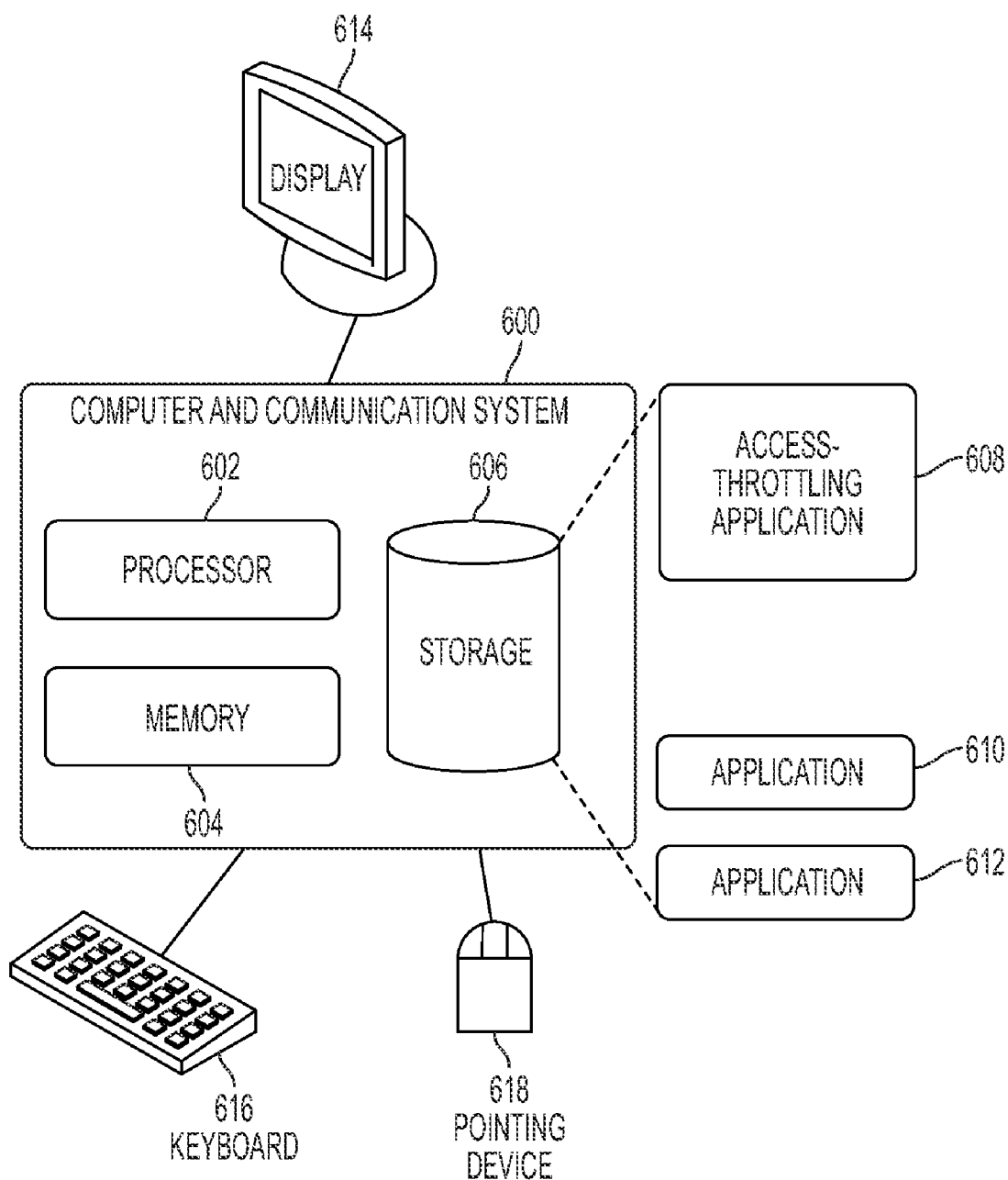
FIG. 6 illustrates an exemplary computer system for access throttling in accordance with one embodiment of the present invention.

FIG. 6 illustrates an exemplary computer system for access throttling in accordance with one embodiment of the present invention. In one embodiment, a computer and communication system 600 includes a processor 602, a memory 604, and a storage device 606. Storage device 606 stores an access-throttling application 608, as well as other applications, such as applications 610 and 612. During operation, access-throttling application 608 is loaded from storage device 606 into memory 604 and then executed by processor 602. While executing the program, processor 602 performs the aforementioned functions. Computer and communication system 600 is coupled to an optional display 614, keyboard 616, and pointing device 618.

In some embodiments, detection mechanisms are also included in the access-throttling system to identify cookie theft, domain name server (DNS)-poisoning, malware-based cloning attacks, and excessive access (which is a symptom of account takeover).

When considering a cookie theft type of attack, it is assumed that the attacker does not have full read access to the victim machine (ruling out malware corruption), and that he cannot access the communication between the victim machine and the trusted throttle server (ruling out an active man-in-the-middle attack). Unless the DNS has been poisoned, cache cookies and browser history cookies can only be read by a party who knows the name of the cached item and the respective URL used to encode the stored information. Thus, the attacker may be able to obtain the domain-based HTML cookie from the victim machine, but no other cookie elements. Consequently, if the throttle server receives only a domain-based HTML cookie from a client machine, it can be a sign of cookie theft.

Similarly, if the victim machine's DNS has been poisoned, then all domain-based cookies will be readable to the attacker, whereas any of the IP-based cookie objects remain inaccessible. Therefore, if the throttle server receives domain-based cookie objects but not IP-based objects from a client machine, it can be a sign of likely DNS poisoning.

By cloning a victim machine, the attacker will have access to all the cookie elements, and will be able to produce a perfect set of cookie objects to an interrogating server of the trusted authority. However, as the attacker's machine will receive a rewritten set of updated cookie objects, the victim machine will have a now-outdated set of cookie elements. When the victim machine contacts a service provider that initiates a throttle mechanism, the throttle server will receive the outdated cookie elements. Receiving an old mark (out-of-date cookies) can be a sign of previous cloning. Although it may not be possible to identify the rightful account owner, the account can simply be flagged.

To detect excessive access, the system needs to correctly identify the machines used to access a site. This can be done by verifying consistency, freshness and the number of cookie elements submitted, along with the associated originating IP addresses, request types, and the nature and count of the previous access requests from the associated account. To verify consistency, the throttle server checks that the identifier of the cookie elements received for a given session all encode the same identifier, but for the differing values of the type variable. Freshness is determined by verifying that the received cookie elements encode an identifier that has not expired. An expired identifier is one that corresponds to an old value of count for the throttle account. These values of counts are synchronized between servers of the throttle server in batches; while servers are not guaranteed to have the most recent value at any given time, it is very unlikely that a server will fail to detect the replay of a cookie that is more than one or two replacements old. Finally, the throttle server determines whether the number of throttle requests (and the associated contexts of these) suggests fraud. Such fraud-detection mechanisms can be similar to current mechanisms used to detect click fraud, credit card fraud, and phone fraud.

It is possible to strengthen the system's ability to detect adversary attacks using the occasional use of a traditional CAPTCHA. Here, it is important to note that the traditional CAPTCHA used here can be relatively weak, and therefore, reasonably easy to solve. This would avoid the problem that the difficulty of passing the throttle task is escalated over time, as is the problem with traditional CAPTCHAs in isolation. For well-designed CAPTCHA systems, human failure rates of about 15% are commercially tolerable, and bot success rates of up to 45% are reported. For the sake of an argument, and erring on the safe side, one can assume worst-case human failure rates of 25% and bot success rates of 50%. Consequently, the probability for a human to fail 375 out of 1000 consecutive tests is less than $2^{-45}$, whereas an adversary will pass the same tests with the same low probability.

Therefore, using the throttle-account-based system, it is possible to detect abuse over time due to the vastly differing cumulative probabilities of success between humans and bots. For example, the throttle server may challenge the user of a machine tied to a throttle account with a traditional CAPTCHA sporadically during a long period of time and records the ratio that the user successfully resolve the CAPTCHAs. If such a ratio is high enough, the throttle server can determine that the corresponding throttle account belongs to a legitimate user. Otherwise, the throttle server can determine that the corresponding throttle account may belong to an adversary implementing bots to solve CAPTCHAs. Note that the use of such statistical success models is not meaningful in an account-less system, such as a system relies on traditional CAPTCHAs, where the adversary has access to a tremendous number of machines and it can simply ditch black-listed machines. Thus, it is necessary to involve a human in the loop for an attack of the throttle-account-based system to be successful. However, even such an approach is not sufficient, because the attacker also has to establish or take over throttle accounts, both of which have a substantial cost.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-executable method for throttling access to a web resource of a web server, comprising:
    associating, by a throttle server, a user to a restricted resource of the user;
    creating a throttle account for the user in response to the user being associated to the restricted resource, wherein the throttle account facilitates throttling access to the web resource;
    associating a unique mark with a computing device of the user;
    receiving a request from the user to access the web resource of the web server, wherein the request is associated with the computing device;
    determining whether the unique mark is present in the computing device;
    based on the determination, generating a response indicating whether the computing device meets a predetermined requirement for throttling access to the web resource without using a CAPTCHA, wherein the predetermined requirement comprises a count number being less than a predetermined number, and wherein the count number counts a number of accesses to the web resource that originated from the computing device; and
    sending the response to the web server providing the web resource, thereby facilitating access throttling to the web resource.

2. The method of claim 1, wherein associating the user to the restricted resource of the user comprises at least one of:
    sending a small payment along with a random message to at least one of the user's financial accounts; and
    sending a random message to the user's cell phone.

3. The method of claim 2, wherein associating the user to the restricted resource of the user further comprises:
    receiving a reply from the user, wherein the reply is sent by the computing device; and
    comparing the user's reply with the previously sent random message.

4. The method of claim 1, wherein the unique mark comprises at least one of the following:
    an HTML cookie;
    a cache cookie; and
    a browsing history cookie.

5. The method of claim 1, further comprising rewriting the unique mark in the computing device after receiving the mark.

6. The method of claim 1, wherein the throttle server and the web server reside on the same machine.

7. A throttle server for throttling access to a web resource of a web server, comprising:
    a processor;
    a memory;
    an account-establishing mechanism configured to:
    associate a user to a restricted resource of the user;
    create a throttle account for the user in response to the user being associated to the restricted resource, wherein the throttle account enables throttling access to the web resource; and
    associate a unique mark with a computing device of the user;
    a receiving mechanism configured to receive a request from the user to access the web resource of the web server, wherein the request is associated with the computing device;
    a throttling mechanism configured to determine whether the unique mark is present in the computing device;
    a response-generating mechanism configured to generate, based on the determination, a response indicating whether the computing device meets a predetermined requirement for throttling access to the resource, wherein the predetermined requirement comprises a count number being less than a predetermined number, and wherein the count number counts a number of accesses to the web resource that originated from the computing device; and
    a sending mechanism configured to send the response to the server providing the web resource, thereby facilitating access throttling to the web resource.

8. The throttle server of claim 7, wherein the account-establishing mechanism is configured to send at least one of:
    a small payment along with a random message to at least one of the user's financial accounts; and
    a random message to the user's cell phone.

9. The throttle server of claim 8, wherein the account-establishing mechanism is further configured to:
    receive a reply from the user, wherein the reply is sent by the computing device; and
    compare the user's reply with the previously sent random message.

10. The throttle server of claim 7, wherein the unique mark comprises at least one of the following:
    an HTML cookie;
    a cache cookie; and
    a browsing history cookie.

11. The throttle server of claim 7, further comprising a rewriting mechanism configured to rewrite the unique mark in the computing device after the receiving mechanism receives the mark.

12. The throttle server of claim 7, wherein the predetermined requirement for accessing the resource comprises a count number being less than a predetermined number, and wherein the count number counts a number of accesses to the web resource originated from the computing device.

13. The throttle server of claim 7, wherein the throttle server and the web server reside on the same machine.

14. A non-transitory computer-readable storage medium storing instructions that when executed by a computer cause the computer to perform a method for throttling access to a web resource of a web server, the method comprising:
associating a user to a restricted resource of the user;
creating a throttle account for the user in response to the user being associated to the restricted resource;
associating a unique mark with a computing device of the user;
receiving a request from the user to access the web resource of the web server, wherein the request is associated with the computing device;
determining whether the unique mark is present in the computing device;
based on the determination, generating a response indicating whether the computing device meets a predetermined requirement for throttling access to the web resource, wherein the predetermined requirement comprises a count number being less than a predetermined number, and wherein the count number counts a number of accesses to the web resource that originated from the computing device; and
sending the response to the server providing the web resource, thereby facilitating access throttling to the web resource.

15. The non-transitory computer-readable storage medium of claim 14, wherein associating the user to the restricted resource of the user comprises at least one of:
sending a small payment along with a random message to at least one of the user's financial accounts; and
sending a random message to the user's cell phone.

16. The non-transitory computer-readable storage medium of claim 15, wherein associating the user to the restricted resource of the user further comprises:
receiving a reply from the user, wherein the reply is sent by the computing device; and
comparing the user's reply with the previously sent random message.

17. The non-transitory computer-readable storage medium of claim 14, wherein the method further comprises rewriting the unique mark in the computing device after receiving the mark.

* * * * *